United States Patent
Nicolas et al.

(10) Patent No.: US 12,252,273 B2
(45) Date of Patent: Mar. 18, 2025

(54) MONITORING FRICTION ASSOCIATED WITH A PLURALITY OF AIRCRAFT WHEELS

(71) Applicants: AIRBUS OPERATIONS LIMITED, Bristol (GB); AIRBUS OPERATIONS (S.A.S.), Toulouse (FR)

(72) Inventors: Vincent Nicolas, Toulouse (FR); Jamie McGirr, Bristol (GB)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 18/125,656

(22) Filed: Mar. 23, 2023

(65) Prior Publication Data
US 2023/0322413 A1    Oct. 12, 2023

(30) Foreign Application Priority Data

Mar. 25, 2022    (GB) .................................... 2204263

(51) Int. Cl.
*B64F 5/60*    (2017.01)
*B60T 8/17*    (2006.01)
(Continued)

(52) U.S. Cl.
CPC .............. *B64F 5/60* (2017.01); *B60T 8/1703* (2013.01); *B60T 8/172* (2013.01); *B64C 25/42* (2013.01); *B64D 45/00* (2013.01); *B64F 5/40* (2017.01); *B60T 2210/12* (2013.01); *B64C 25/36* (2013.01); *B64D 2045/0085* (2013.01);
(Continued)

(58) Field of Classification Search
CPC ... B64F 5/40; B64F 5/60; B64C 25/34; B64C 25/42; B60T 8/1703; B60T 8/172; B60T 2210/12; B64D 45/00; B64D 2045/0085
See application file for complete search history.

(56) References Cited

U.S. PATENT DOCUMENTS

| 8,102,280 B2 | 1/2012 | Cahill |
| 8,634,971 B2 | 1/2014 | Cahill |

(Continued)

FOREIGN PATENT DOCUMENTS

| EP | 2 940 675 | 11/2015 |
| EP | 3051267 | 3/2016 |

(Continued)

OTHER PUBLICATIONS

Combined Search and Examination Report cited in GB2204263.4, mailed Sep. 23, 2022, 6 pages.

*Primary Examiner* — John M Zaleskas
(74) *Attorney, Agent, or Firm* — Nixon & Vanderhye P.C.

(57) ABSTRACT

A method of monitoring friction associated with a plurality of aircraft wheels of an aircraft, the method including, for each of the plurality of aircraft wheels, obtaining wheel speed data associated with the aircraft wheel. The method includes determining, based at least in part on the wheel speed data, deceleration of the aircraft wheel during a time interval, and determining, based at least in part on the determined deceleration, a value indicative of friction associated with the aircraft wheel. The method includes providing, based at least in part on the determined value, a signal indicative of a level of friction associated with the aircraft wheel.

20 Claims, 6 Drawing Sheets

(51) Int. Cl.
  *B60T 8/172* (2006.01)
  *B64C 25/36* (2006.01)
  *B64C 25/42* (2006.01)
  *B64D 45/00* (2006.01)
  *B64F 5/40* (2017.01)
(52) U.S. Cl.
  CPC ...... *F16C 2233/00* (2013.01); *F16C 2326/43* (2013.01); *F16C 2361/45* (2013.01)

(56) References Cited

U.S. PATENT DOCUMENTS

| | | | |
|---|---|---|---|
| 8,666,625 B1* | 3/2014 | Georgin | B60T 17/22 |
| | | | 701/70 |
| 10,005,566 B2 | 6/2018 | Cahill | |
| 10,093,298 B2 | 10/2018 | Kipp | |
| 2005/0040286 A1* | 2/2005 | Radford | B64C 25/46 |
| | | | 188/264 R |
| 2009/0276133 A1* | 11/2009 | May | B64C 25/46 |
| | | | 188/1.11 E |
| 2010/0225503 A1* | 9/2010 | Cahill | B60T 17/22 |
| | | | 340/960 |
| 2010/0286880 A1* | 11/2010 | Cahill | B60T 17/221 |
| | | | 701/70 |
| 2010/0286881 A1* | 11/2010 | Cahill | F16D 66/026 |
| | | | 701/70 |
| 2014/0018978 A1* | 1/2014 | Cahill | B60T 8/1703 |
| | | | 701/3 |
| 2014/0156160 A1* | 6/2014 | DeVlieg | B60T 8/00 |
| | | | 701/70 |
| 2015/0012153 A1* | 1/2015 | Metzger, Jr. | B60T 8/172 |
| | | | 702/43 |
| 2015/0142217 A1* | 5/2015 | Metzger, Jr. | B60T 8/1703 |
| | | | 701/3 |
| 2015/0142388 A1* | 5/2015 | Metzger | B60T 8/172 |
| | | | 702/189 |
| 2015/0254990 A1* | 9/2015 | Raby | G08G 5/0086 |
| | | | 701/16 |
| 2015/0316929 A1* | 11/2015 | Veronesi | B64C 25/426 |
| | | | 701/16 |
| 2016/0223431 A1* | 8/2016 | Summers | G01M 17/013 |
| 2016/0340033 A1* | 11/2016 | Raby | G08G 5/025 |
| 2017/0197606 A1* | 7/2017 | Kipp | B60T 8/885 |
| 2017/0355473 A1* | 12/2017 | Cahill | B64C 25/34 |
| 2018/0237131 A1* | 8/2018 | Cahill | B60T 8/1763 |
| 2019/0263373 A1* | 8/2019 | Jimenez | B60T 8/58 |
| 2019/0263374 A1* | 8/2019 | Bill | B60T 8/58 |
| 2019/0263375 A1* | 8/2019 | Oza | B60T 17/221 |
| 2019/0263506 A1* | 8/2019 | Hubbard | B64C 25/46 |
| 2019/0263510 A1* | 8/2019 | Bill | B60T 8/171 |
| 2020/0023949 A1* | 1/2020 | Cahill | B64C 25/42 |
| 2020/0172066 A1* | 6/2020 | Burte | B60T 8/1703 |
| 2020/0172077 A1* | 6/2020 | Burte | F16D 66/00 |
| 2021/0024201 A1* | 1/2021 | Chico | B60T 8/1703 |
| 2021/0237708 A1* | 8/2021 | Franzini | B60T 8/1703 |
| 2021/0284120 A1* | 9/2021 | Georgin | B60T 17/221 |
| 2021/0347350 A1* | 11/2021 | Bains | B60T 8/1703 |
| 2021/0402973 A1* | 12/2021 | Bill | B60T 8/325 |

FOREIGN PATENT DOCUMENTS

| | | |
|---|---|---|
| EP | 3 363 697 | 8/2018 |
| EP | 3257712 | 3/2021 |
| FR | 2 942 758 | 9/2010 |

* cited by examiner

MONITORING FRICTION ASSOCIATED WITH A PLURALITY OF AIRCRAFT WHEELS

RELATED APPLICATION

This application incorporates by reference and claims priority to United Kingdom patent application GB 2204263.4, filed Mar. 25, 2022.

TECHNICAL FIELD

The present invention relates to a method of monitoring friction associated with a plurality of aircraft wheels of an aircraft.

BACKGROUND

Aircraft typically comprise one or more landing gear assemblies to support the aircraft when it is not flying, thereby allowing the aircraft to take-off, land and taxi. Some landing gear assemblies may comprise wheels that rotate to enable the aircraft to travel along a surface.

SUMMARY

A first aspect of the present invention provides a method of monitoring friction associated with a plurality of aircraft wheels of an aircraft, the method comprising, for each of the plurality of aircraft wheels: obtaining wheel speed data associated with the aircraft wheel; determining, based at least in part on the wheel speed data, deceleration of the aircraft wheel during a time interval; determining, based at least in part on the determined deceleration, a value indicative of friction associated with the aircraft wheel; and providing, based at least in part on the determined value, a signal indicative of a level of friction associated with the aircraft wheel.

By monitoring friction associated with each of the plurality of aircraft wheels, and providing a signal indicative of the level of friction associated with the aircraft wheel, one or more of aircraft crew, ground staff, and maintenance personnel may be informed of the level of friction associated with the aircraft wheel, which may enable appropriate maintenance action to be taken, if required, to ensure the level of friction remains within normal operating parameters.

Optionally, the determining the value indicative of friction associated with the aircraft wheel comprises utilising at least one of historic wheel data, simulated wheel data, and experimental wheel data.

Optionally, the determining the value indicative of friction associated with the aircraft wheel comprises performing feature scaling on the determined deceleration, the feature scaling based at least in part on minimum and maximum deceleration values obtained from at least one of historic wheel data, simulated wheel data, and experimental wheel data.

Optionally, the obtaining wheel speed data comprises obtaining wheel speed data associated with the aircraft wheel when the aircraft is in flight, and wherein the time interval is a time period when the aircraft is in flight.

Optionally, the performing feature scaling comprises performing a min-max scaling using the determined deceleration, and the maximum and minimum deceleration values.

Optionally, the time interval comprises a start point determined by take-off of an aircraft comprising the aircraft wheel, and an end point determined by retraction of a landing gear comprising the aircraft wheel.

Optionally, the end point of the time interval occurs prior to retraction braking of the aircraft wheel. Optionally, the end point of the time interval occurs in response to a signal indicating performance of retraction braking is about to take place. Retraction braking may comprise braking of a wheel prior to or during retraction of a landing gear that comprises the wheel.

Optionally, take-off of the aircraft is determined using at least one of a weight-on-wheels sensor, a proximity sensor, and a wheel speed sensor.

Optionally, the method comprises comparing the determined value to a friction threshold, and providing the signal where the determined value exceeds the friction threshold, for example by more than a pre-determined amount.

Optionally, the method comprises, for each of a plurality of flights of an aircraft comprising the aircraft wheel: obtaining wheel speed data associated with the aircraft wheel; determining, based at least in part on the wheel speed data, deceleration of the aircraft wheel during a time interval; determining, based at least in part on the determined deceleration, the value indicative of friction associated with the aircraft wheel; and providing, based at least in part on the determined value, the signal indicative of a level of friction associated with the aircraft wheel.

Optionally, the method comprises, for each of the plurality of flights, comparing the determined value to a friction threshold, and where the determined value exceeds the friction threshold for more than a threshold number of flights, determining an altered level of friction associated with the aircraft wheel. An altered level of friction associated with the wheel may comprise an increased level of friction relative to an expected level of friction to occur in normal operating conditions of the wheel.

Optionally, determining the altered level of friction associated with the aircraft wheel takes place where the determined value exceeds the friction threshold for more than a threshold number of flights within a window. Optionally the window comprises a pre-determined time period, or a pre-determined number of past flights.

Optionally, determining the altered level of friction associated with the aircraft wheel takes place where the determined value exceeds the friction threshold for 5 or more flights within the last 20 flights.

Optionally, the determining deceleration of the aircraft wheel during the time interval comprises performing a linear regression on the obtained wheel speed data.

Optionally, the signal is provided to one or more of aircraft crew, ground staff, and a maintenance system.

Optionally, the signal is provided by one or more of a visual indicator and an aural indicator. Optionally, the signal is provided by a plot of level of friction per flight.

Optionally, the method comprises storing the value in memory, and providing the signal comprises reading the stored value from the memory.

Optionally, the method comprises scheduling maintenance on the basis of the signal, for example automatically in response to the signal via one or more maintenance scheduling systems.

A second aspect of the present invention provides an aircraft system comprising: a plurality of aircraft wheels; and one or more controllers configured to, for each aircraft wheel, perform a friction monitoring method comprising: obtaining wheel speed data associated with the aircraft wheel; determining, based at least in part on the wheel speed data, deceleration of the aircraft wheel during a time interval; determining, based at least in part on the determined deceleration, a value indicative of friction associated with the aircraft wheel; and providing, based at least in part on the determined value, a signal indicative of a level of friction associated with the aircraft wheel.

Optionally, the aircraft system comprises a plurality of brakes associated with corresponding ones of the plurality of aircraft wheels, and the one or more controllers are configured to perform the friction monitoring method where pressures associated with the plurality of brakes are below a pressure threshold.

Optionally, the aircraft system comprises a wheel speed sensor for obtaining the wheel speed data. Optionally, the wheel speed sensor comprises a tachometer. Optionally, the aircraft comprises a plurality of wheel speed sensors, for example one wheel speed sensor per wheel.

Optionally, obtaining wheel speed data comprises obtaining wheel speed data associated with the aircraft wheel when the aircraft is in flight, and wherein the time interval is a time period when the aircraft is in flight.

Optionally, the time interval comprises a start point determined by take-off of an aircraft comprising the aircraft wheel, and an end point determined by retraction of a landing gear comprising the aircraft wheel, and the aircraft system comprises a weight-on-wheels sensor for determining the take-off of the aircraft.

Optionally, the aircraft system comprises a display located remotely from an aircraft comprising the plurality of aircraft wheels, and the one or more controllers are configured to cause, based at least in part on the signal, the display to indicate the level of friction associated with the aircraft wheel.

A third aspect of the present invention provides an aircraft comprising an aircraft system according to the second aspect of the present invention.

A fourth aspect of the present invention provides a data carrier comprising machine readable instructions for the operation of one or more processors of a controller of an aircraft system comprising a plurality of aircraft wheels to, for each aircraft wheel, perform a friction monitoring method comprising: obtaining wheel speed data associated with the aircraft wheel; determining, based at least in part on the wheel speed data, deceleration of the aircraft wheel during a time interval; determining, based at least in part on the determined deceleration, a value indicative of friction associated with the aircraft wheel; and providing, based at least in part on the determined value, a signal indicative of a level of friction associated with the aircraft wheel.

A fifth aspect of the present invention provides a method of determining performance of a maintenance action for a wheel of an aircraft, the method comprising: for each of a plurality of flights of the aircraft, monitoring a speed of the wheel during a time interval post take-off of the aircraft, and utilising the monitored speed to obtain a value indicative of friction associated with the wheel; comparing each of the values of the plurality of flights to a friction threshold; and where the number of values that exceed the friction threshold is greater than a numerical threshold within a given window, determining that the maintenance action is required.

A sixth aspect of the present invention provides an aircraft system comprising a wheel of an aircraft, and one or more controllers configured to: for each of a plurality of flights of the aircraft, monitor a speed of the wheel during a time interval post take-off of the aircraft, and utilise the monitored speed to obtain a value indicative of friction associated with the wheel; compare each of the values of the plurality of flights to a friction threshold; and where the number of values that exceed the friction threshold is greater than a numerical threshold within a given window, determine that a maintenance action is required.

A seventh aspect of the present invention provides an aircraft comprising an aircraft system according to the sixth aspect of the present invention.

An eighth aspect of the present invention provides a data carrier comprising machine readable instructions for the operation of one or more processors of a controller of an aircraft system comprising a wheel of an aircraft to: for each of a plurality of flights of the aircraft, monitor a speed of the wheel during a time interval post take-off of the aircraft, and utilise the monitored speed to obtain a value indicative of friction associated with the wheel; compare each of the values of the plurality of flights to a friction threshold; and where the number of values that exceed the friction threshold is greater than a numerical threshold within a given window, determine that a maintenance action is required.

Optionally, the monitoring the speed of the wheel comprises monitoring the speed of the wheel associated the aircraft wheel when the aircraft is in flight and wherein the time interval is a time period when the aircraft is in flight.

BRIEF DESCRIPTION OF THE DRAWINGS

Embodiments of the invention will now be described, by way of example only, with reference to the accompanying drawings, in which.

DETAILED DESCRIPTION

Figure 1:
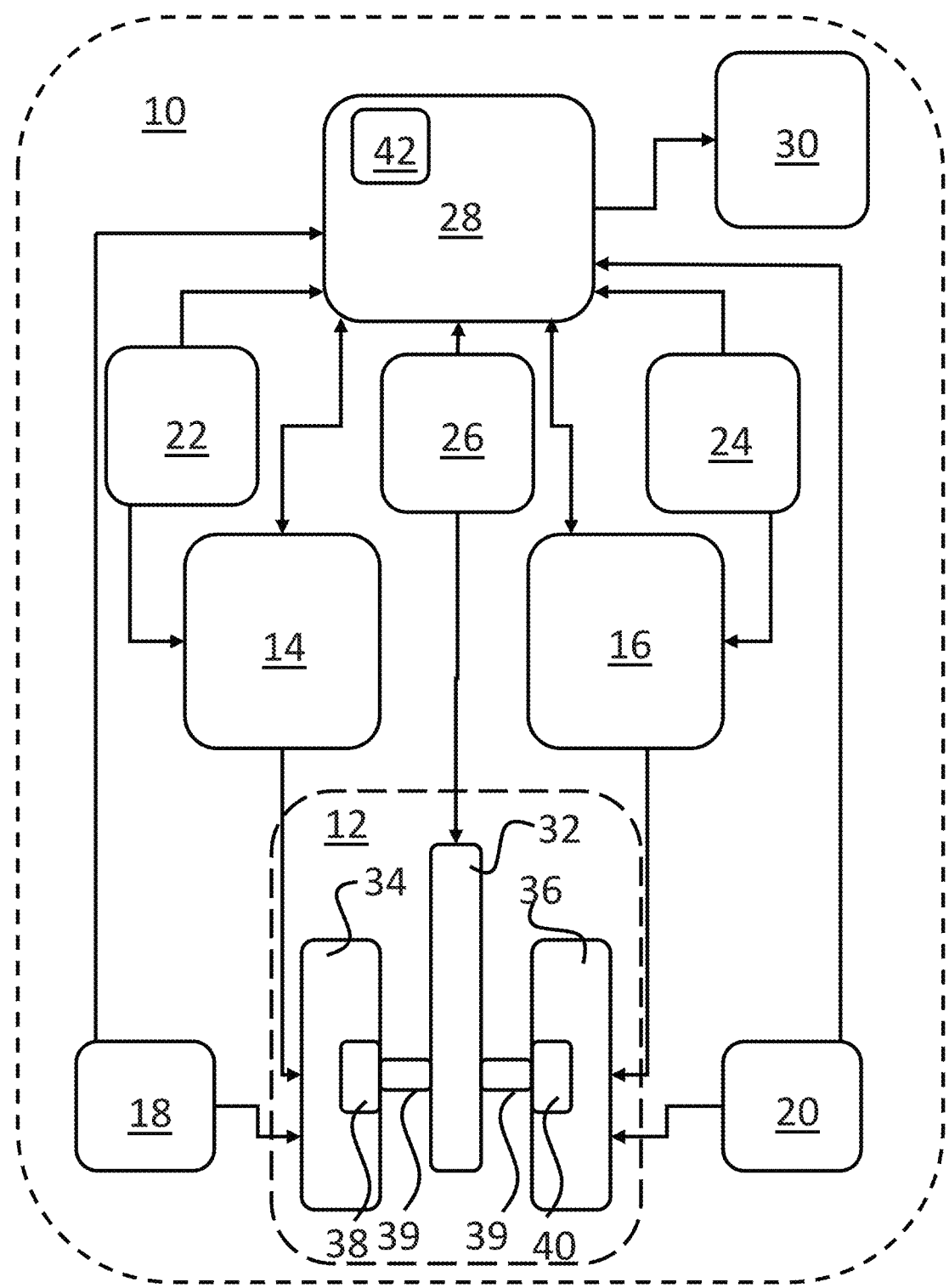
FIG. 1 shows a schematic view of an aircraft system.

An aircraft system 10 is illustrated schematically in FIG. 1, and comprises a landing gear assembly 12, first 14 and second 16 hydraulic brakes, first 18 and second 20 tachometers, first 22 and second 24 pressure sensors, a weight-on-wheels sensor 26, a controller 28, and an indicator 30. It will be appreciated that in practice at least some of the components of the aircraft system 10 may be considered part of the landing gear assembly 12.

Figure 2:
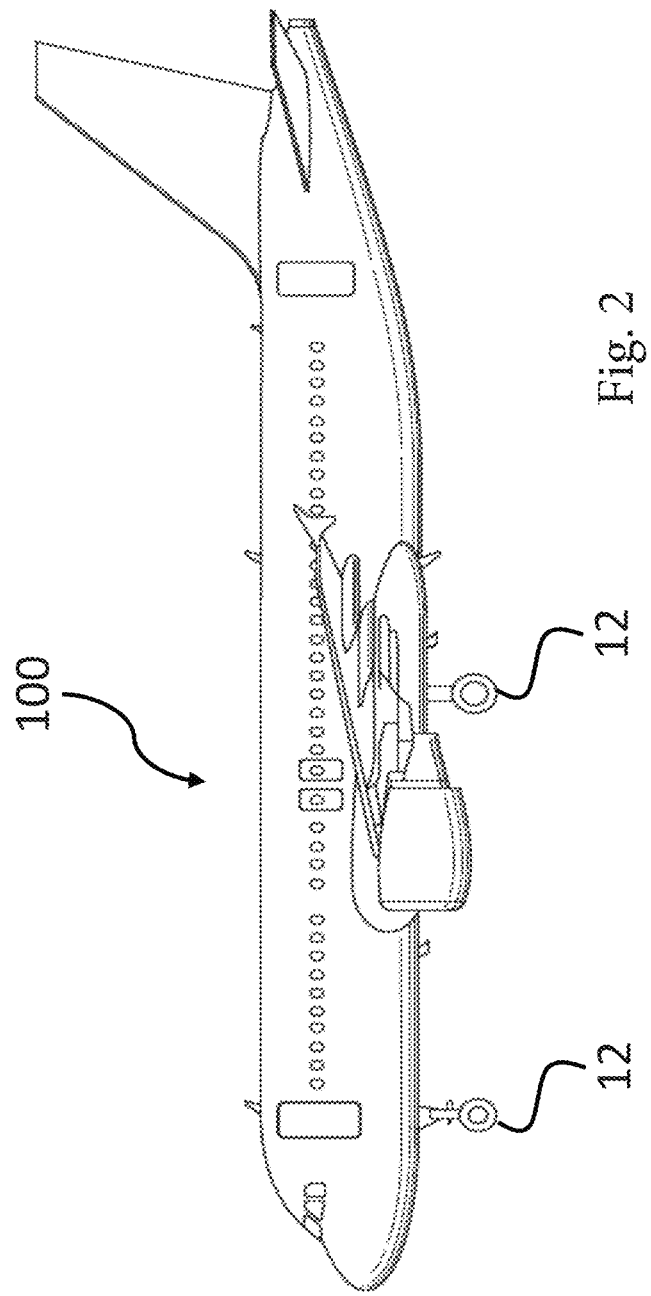
FIG. 2 shows a schematic view of an aircraft comprising the aircraft system of FIG. 1.

The landing gear assembly 12 comprises a strut 32, and first 34 and second 36 wheels rotatably mounted to the strut 32 by corresponding first 38 and second 40 bearing assemblies and an axle 39. The first 38 and second 40 bearing assemblies comprise rolling bearings. The landing gear assembly 12 is retractably mounted to the body of an aircraft 100 in use. The aircraft 100 is illustrated schematically in FIG. 2.

The first 14 and second 16 hydraulic brakes are configured to selectively apply a braking response to the respective first 34 and second 36 wheels. The first 22 and second 24 pressure sensors are configured to sense pressure applied to the first 34 and second 36 wheels by the first 14 and second 16 hydraulic brakes. The weight-on wheels sensor 26 is utilised to determine whether the first 34 and second 36 wheels are on the ground or not, and as such the weighton-wheels sensor 26 is utilised to determine when take-off of the aircraft 100 has occurred.

The controller 28 comprises one or more processors 42, and is configured to send and/or receive data to and/or from the first 14 and second 16 hydraulic brakes, the first 18 and second 20 tachometers, the first 22 and second 24 pressure sensors, and the weight-on-wheels sensor 26. The controller 28 may be disposed locally on-board the aircraft 100, or may be located remotely off-board the aircraft 100.

The indicator 30 is configured to receive one or more signals from the controller 28, and provide an indication, based on the received signals, to an operator such as aircraft crew, ground staff, and/or maintenance personnel. The indicator 30 may be located on-board the aircraft 100, or may be located remotely off-board the aircraft 100. The indicator may comprise a visual indicator, such as a display, or an audible indicator, such as an audio transducer.

In use, friction may occur as a result of the interaction between the first 14 and second 16 hydraulic brakes and the respective first 34 and second 36 wheels, and/or friction may occur as a result of the interaction between the first 34 and second 36 wheels and the respective first 38 and second 40 bearing assemblies. Monitoring such friction may enable the impact of the friction on components of the aircraft system 10, or indeed other components of the aircraft 100, to be monitored, and may enable appropriate maintenance action to be taken to prevent the level of friction becoming excessively high.

Figure 3:
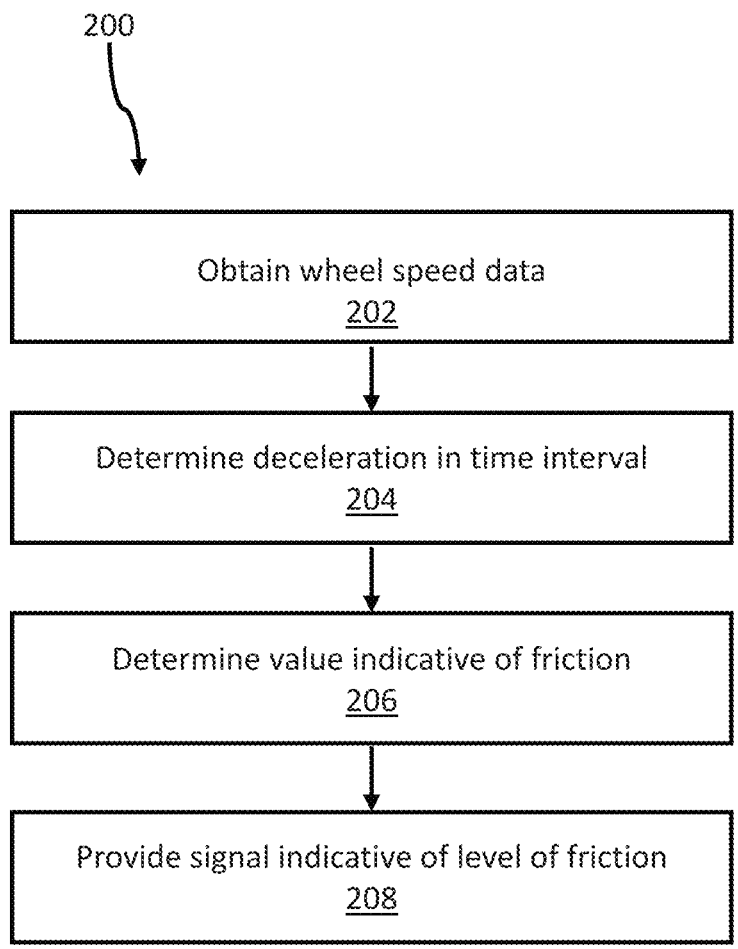
FIG. 3 shows a flow diagram of a first method according to the present disclosure.

A method 200 of monitoring friction associated with the first 34 and second 36 wheels is illustrated schematically in FIG. 3. The method 200 comprises, for each of a plurality of aircraft wheels, obtaining 202 wheel speed data associated with the aircraft wheel, and determining 204, based at least in part on the wheel speed data, deceleration of the aircraft wheel during a time interval. The method 200 comprises determining 206, based at least in part on the determined deceleration, a value indicative of friction associated with the aircraft wheel, and providing 208, based at least in part on the determined value, a signal indicative of a level of friction associated with the aircraft wheel.

By monitoring friction associated with each of the plurality of aircraft wheels, and providing a signal indicative of the level of friction associated with the aircraft wheel, one or more of aircraft crew, ground staff, and maintenance personnel may be informed of the level of friction associated with the aircraft wheel, which may enable appropriate maintenance action to be taken, if required, to ensure the level of friction remains within normal operating parameters.

More specifically, it has been recognised that an appropriate time in which to monitor friction associated with aircraft wheels may be a period shortly after take-off of the aircraft, in which the wheels should be free to rotate before braking prior to or during retraction of landing gear occurs. Excessive friction in this period may then be indicative of altered frictional conditions associated with the wheel, for example as a result of unintentional braking and/or bearing friction.

Figure 4:
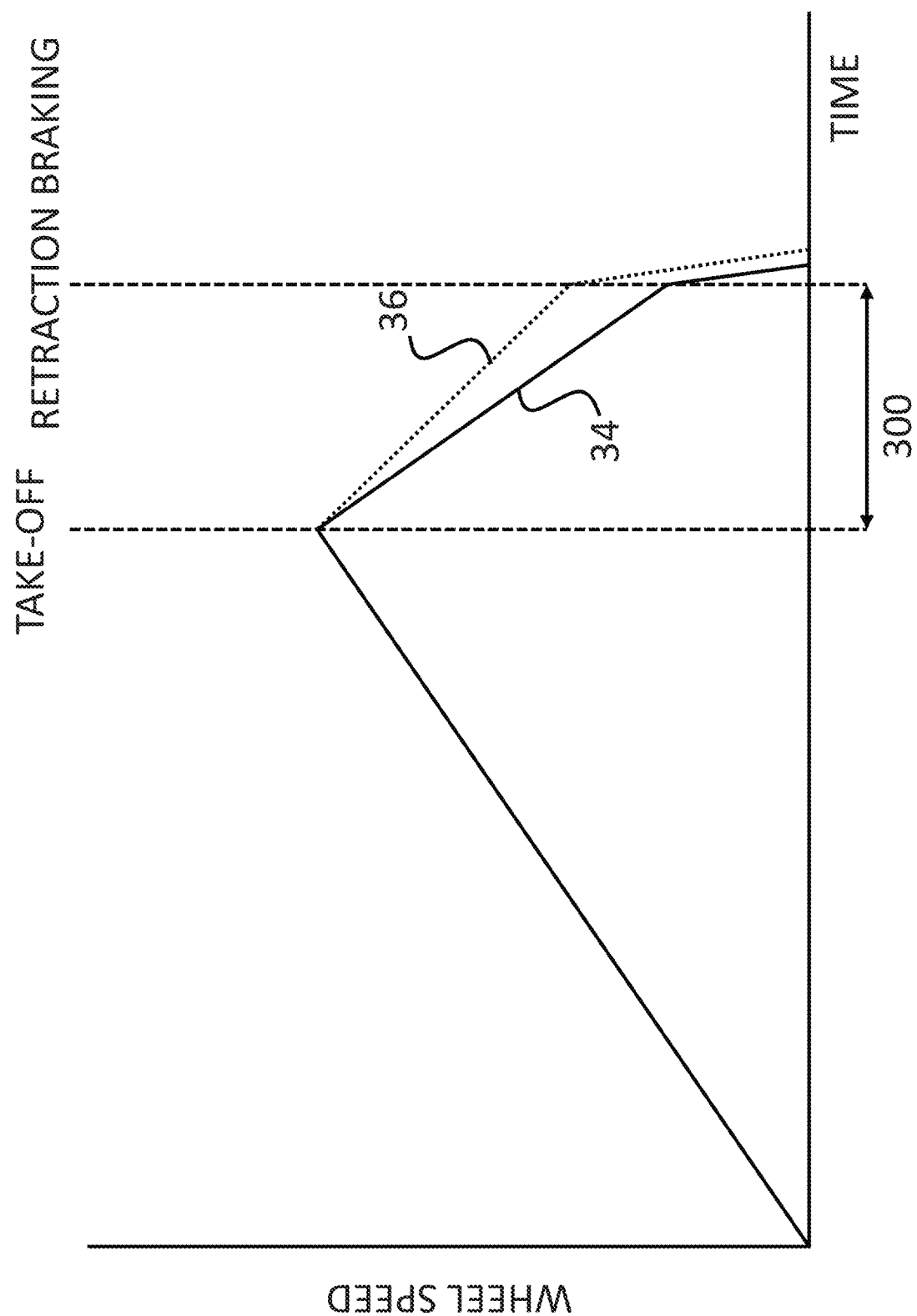
FIG. 4 shows a plot of wheel speed over time.

Thus, in the aircraft system 10, the weight-on-wheels sensor 26 is utilised to determine take-off of the aircraft 100, and the first tachometer 18 is configured to monitor the wheel speed of the first wheel 34 during a time interval that starts with take-off of the aircraft 100, and ends with retraction braking being applied to the first wheel 34 by the first hydraulic brake 14. Such a time interval 300 is illustrated schematically in the plot of FIG. 4. During the time interval 300, there should be no residual pressure applied to the first wheel 34 by the first hydraulic brake, and the first pressure sensor 22 is utilised to ensure that this is the case.

Wheel speed data obtained from the first tachometer 18 during the time interval 300 is sent to the controller 28, and the controller 28 determines deceleration of the first wheel 34 during the time interval 300. The deceleration is determined using a linear regression method to fit the wheel speed data.

Once the controller 28 has determined the deceleration of the first wheel 34 during the time interval 300, the controller 28 uses the deceleration to determine a value indicative of friction associated with the first wheel 34 during the time interval 300. Such a value is determined by applying a min-max scaling of the determined deceleration to obtain a value between 0 and 100, with the minimum and maximum values for the scaling determined best on historic best- and worst-case deceleration values obtained from historic flight data. Such best- and worst-case deceleration values are here indicative of minimum and maximum friction levels historically associated with wheels on a similar aircraft. Use of a value between 0 and 100 may provide a readily understandable scale for the value, which may facilitate ease of comparison of the value to determine altered levels of friction as will be discussed in more detail hereafter.

An exemplary min-max scaling may be provided by an equation of the form:

$$x' = \frac{(x - \min(x)) * 100}{\max(x) - \min(x)}$$

where x' is the value to be determined, x is the determined deceleration, min (x) is the historic minimum deceleration value, and max (x) is the historic maximum deceleration value. Whilst historic best- and worst-case deceleration values, i.e. minimum and maximum historic deceleration values, have been utilised here, it will be appreciated that other best- and worst-case deceleration values may be utilised, for example those obtained by simulation and/or experimental data.

When the value indicative of friction associated with the first wheel 34 during the time interval 300 has been obtained, the value is stored in memory. The memory may form part of the controller, or the memory may comprise a standalone unit located elsewhere on the aircraft 100, and/or may be located remotely from the aircraft 100. Such storing of the value in memory, and/or reading of the value from the memory, can be thought of as providing a signal indicative of a level of friction associated with the first aircraft wheel 34.

This process is repeated over a number of flights of the aircraft 100 with each value for a given flight either stored in memory of the controller 28, stored in a wider memory of the aircraft 100, or transmitted to and stored in a remote memory location. Each stored value is compared to a friction threshold which is indicative of a normal level of friction associated with the first wheel 34, for example with values above the friction threshold comprising values which indicate relatively high levels of friction. The friction threshold may be chosen to be lower than a value which would cause an in-flight altered operating condition warning to be provided. Where a pre-determined number of values exceed the friction threshold within a pre-determined flight window, an indication of an altered level of friction associated with the first wheel 34 is provided.

Figure 5:
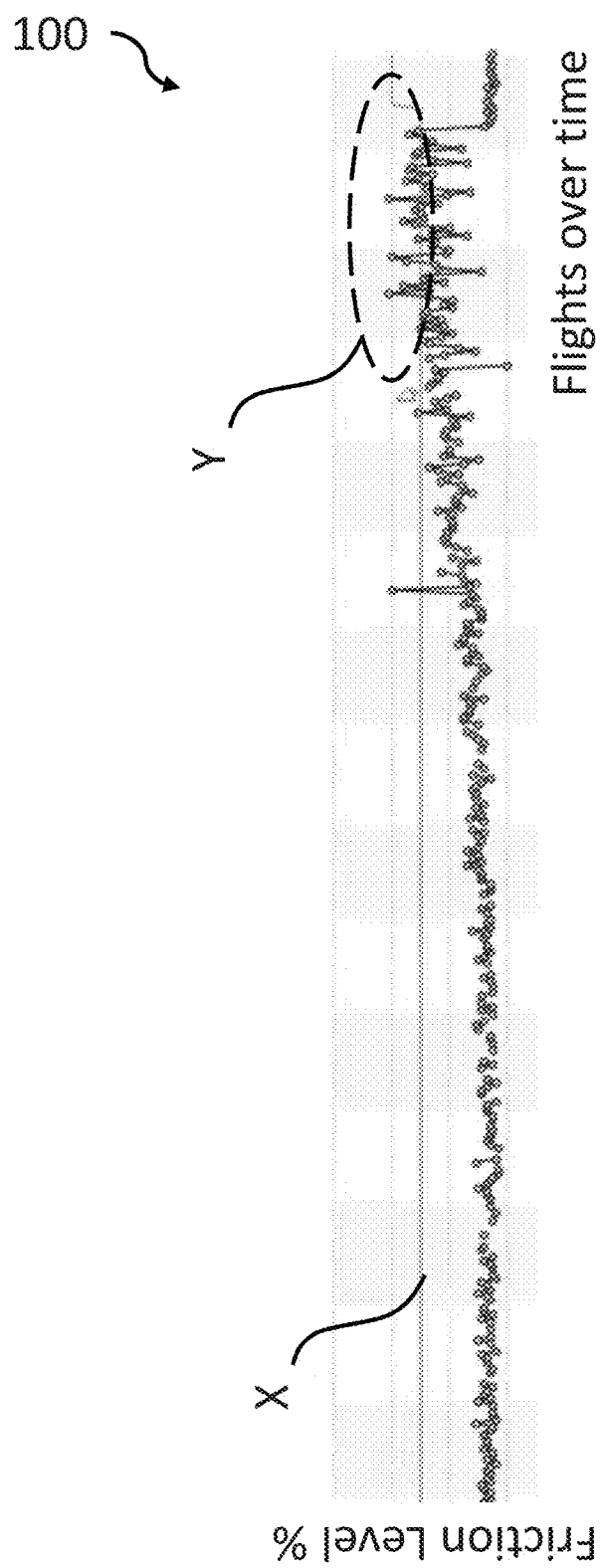
FIG. 5 shows a plot of friction values for a number of flights.

Examples of stored values are indicated in the graph of FIG. 5, with each point corresponding to a value indicative of friction associated with the first wheel 34 for a given flight. Here, the friction threshold is illustrated as X. In some examples, X is in the region of 20 to 50%, for example around 30%. Where stored values for a pre-determined number of flights, say a number of flights between two and ten flights within a flight window of the last twenty flights, exceed the friction threshold X, an indication of an altered level of friction associated with the first aircraft wheel 34 is provided. Such a situation is illustrated in the circled region Y of the plot of FIG. 5.

As will be appreciated, the indication may take many forms. For example, where the controller 28 stores the values in local memory of the aircraft 100, when a value is determined that causes the above-mentioned criteria to be met, the indicator 30 may provide a visual indication to flight crew of the aircraft 100, in the form of an illuminated light or an on-screen message, that an altered level of friction associated with the first wheel 34 has been determined. In such a circumstance, the flight crew of the aircraft 100 may record the indication in a log and/or flag the indication to on-ground maintenance personnel such that the first wheel 34, and/or the first hydraulic brake 14 and/or the first bearing assembly 38 can be examined and replaced as required.

In some examples, the comparison steps may be performed by the controller 28, with the indication of an altered level of friction associated with the first wheel 34 being transmitted from the controller 28 to the indicator 30 for display by the indicator 30. For example, comparative and/or computational steps may be performed by the controller 28, with the remote indicator 30 being used to display the indication to on-ground maintenance personnel. The indication in such examples may comprise an illuminated light or an on-screen message, or a visual representation such as the plot of FIG. 5.

In some examples, where the controller 28 transmits the values storage in remote memory, and the indicator 30 is located remotely from the aircraft 100, comparative and/or computational steps may be performed remotely from the aircraft 100 based on data transmitted by the controller 28, with the indicator 30 communicating the indication of an altered level of friction associated with the first wheel 34 to on-ground maintenance personnel. The indication in such examples may comprise an illuminated light or an on-screen message, or a visual representation such as the plot of FIG. 5.

Whilst visual forms of indication have been described above, it will be appreciated that other forms of indication, for example aural indications, are also envisaged. Furthermore, it will be appreciated that the raw data values of the values indicative of friction associated with the first aircraft wheel 34, may be considered an indication of an altered level of friction associated with the first aircraft wheel 34, given that an altered level of friction may be derived from the raw data values.

In response to the indication by the indicator 30, a maintenance action can be scheduled by one or more of aircraft personnel, ground staff, or maintenance crew, as appropriate.

In some examples, rather than providing the indication via the indicator 30, a maintenance action may be automatically scheduled, for example by the controller 28, based on a signal representing the value indicating friction associated with the first aircraft wheel 34.

The steps described above in respect of the first wheel 34 can similarly be applied in respect of the second wheel 36, enabling a full picture of friction associated with each of the first 34 and second 36 wheels to be obtained. It will be appreciated that such methods can be extended to any number of wheels in practice. The wheel speed data for the first 34 and second 36 wheels is indicated schematically in FIG. 4, where it can be seen that the first wheel 34 experiences greater deceleration over the time interval 300, and hence is experiencing a greater level of friction.

Figure 6:
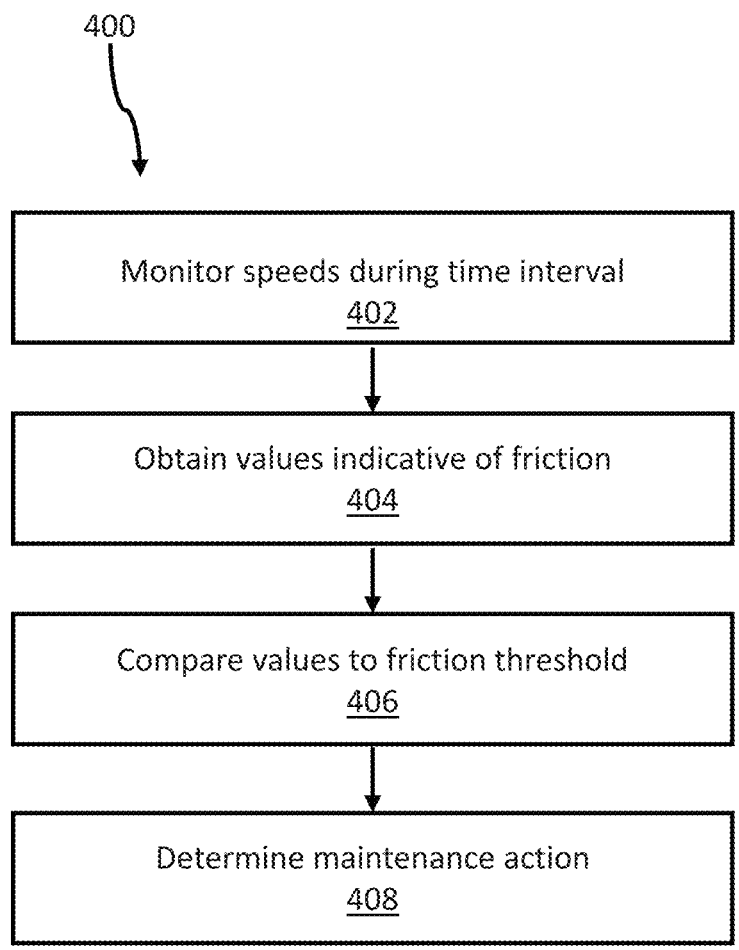
FIG. 6 shows a flow diagram of a second method according to the present disclosure.

A further method 400 in accordance with the above is illustrated schematically in the flow diagram of FIG. 6. The method 400 comprises, for each of a plurality of flights of the aircraft, monitoring 402 a speed of the wheel during a time interval post take-off of the aircraft, and utilising 404 the monitored speed to obtain a value indicative of friction associated with the wheel. The method 400 comprises comparing 406 each of the values of the plurality of flights to a friction threshold, and where the number of values that exceed the friction threshold is greater than a numerical threshold within a given flight window, determining 408 that a maintenance action is required.

Whilst described above in relation to monitoring over a plurality of flights, it will also be appreciated that the method 100 of FIG. 3 can also be utilised to provide an indication of a level of friction associated with a given wheel for a single flight, for example with the indicator 30 being used to provide an immediate indication where a value exceeds the friction threshold by more than a pre-determined amount. In such examples, the level of friction associated with the given wheel may be deemed to be sufficiently high that an immediate indication needs to be provided to one or more of aircraft personnel, ground staff and/or maintenance crew.

It is to noted that the term "or" as used herein is to be interpreted to mean "and/or", unless expressly stated otherwise.

The invention claimed is:

1. A method of monitoring friction associated with a plurality of aircraft wheels of an aircraft, the method comprising:
    retracting at least one landing gear including the aircraft wheels after take-off of the aircraft; and
    for each aircraft wheel of the plurality of aircraft wheels:
        obtaining wheel speed data associated with the aircraft wheel during a period between when take-off of the aircraft occurs and when retraction braking is applied to the aircraft wheel;
        determining that no residual pressure was applied by the brake to the aircraft wheel during a time interval within the period;
        determining, based at least in part on the wheel speed data, deceleration of the aircraft wheel during the time interval;
        determining, based at least in part on the determined deceleration, a value indicative of friction associated with the aircraft wheel; and
        providing, based at least in part on the determined value, a signal indicative of a level of friction associated with the aircraft wheel.

2. The method according to claim 1, wherein the determining the value indicative of friction associated with the aircraft wheel comprises utilizing at least one of historic wheel data, simulated wheel data, and experimental wheel data.

3. The method according to claim 1, wherein the determining the value indicative of friction associated with the aircraft wheel comprises:

performing feature scaling on the determined deceleration, the feature scaling is based at least in part on minimum and maximum deceleration values obtained from at least one of historic wheel data, simulated wheel data, and experimental wheel data.

4. The method according to claim 1, wherein the wheel speed data is obtained when the aircraft is in flight, and wherein the time interval is a time period when the aircraft is in flight.

5. The method according to claim 1, wherein the take-off of the aircraft is determined using at least one of a weight-on-wheels sensor, a proximity sensor, and a wheel speed sensor.

6. The method according to claim 1, wherein the method further comprises:
determining that the determined value exceeds a friction threshold, and
the providing the signal comprises providing the signal where the determined value exceeds the friction threshold.

7. The method according to claim 1, wherein the determining the deceleration of the aircraft wheel during the time interval comprises performing a linear regression on the obtained wheel speed data.

8. The method according to claim 1, wherein the signal is provided to one or more of aircraft crew, ground staff, and a maintenance system.

9. The method according to claim 1, wherein the method comprises scheduling maintenance based on the signal.

10. The method according to claim 1, further comprising:
monitoring pressure applied by the brake to the aircraft wheel during the time interval;
obtaining pressure data from a pressure sensor, wherein the pressure data indicates the pressure applied by the brake to the aircraft wheel during the time interval;
the determining that no residual pressure was applied by the brake is based on the pressure data; and
providing the signal indicative of the level of friction only if the determination is that no residual pressure was applied by the brake to the aircraft wheel during the time interval.

11. The method according to claim 1, wherein the determining the value is based on where the determined deceleration is on a scale of minimum to maximum decelerations.

12. A method of monitoring friction associated with an aircraft wheel of an aircraft, the method comprising, for each of a plurality of flights of the aircraft:
retracting a landing gear with the aircraft wheel after take-off of the aircraft;
during a period between when take-off of the aircraft occurs and when retraction braking is applied to the aircraft wheel, obtaining wheel speed data associated with the aircraft wheel;
determining that no residual pressure was applied by the brake to the aircraft wheel during a time interval within the period;
determining, based at least in part on the wheel speed data, deceleration of the aircraft wheel during the time interval;
determining, based at least in part on the determined deceleration, the value indicative of friction associated with the aircraft wheel; and
providing, based at least in part on the determined value, the signal indicative of a level of friction associated with the aircraft wheel.

13. The method according to claim 12, wherein the method further comprises, for each of the plurality of flights:
comparing the determined value to a friction threshold, and
where the determined value exceeds the friction threshold for more than a threshold number of flights, determining an altered level of friction associated with the aircraft wheel.

14. An aircraft system comprising:
a plurality of aircraft wheels;
a landing gear retraction system configured to retract at least one landing gear with the plurality of aircraft wheels; and
one or more controllers configured to, for each aircraft wheel of the plurality of aircraft wheels, monitor friction by:
obtaining wheel speed data associated with the aircraft wheel during a period between when take-off of the aircraft occurs and when retraction braking is applied to the aircraft wheel;
determining that no residual pressure was applied by the brake to the aircraft wheel during a time interval within the period;
determining, based at least in part on the wheel speed data, deceleration of the aircraft wheel during the time interval;
determining, based at least in part on the determined deceleration, a value indicative of friction associated with the aircraft wheel; and
providing, based at least in part on the determined value, a signal indicative of a level of friction associated with the aircraft wheel.

15. The aircraft system as claimed in claim 14, wherein the aircraft system comprises a plurality of brakes each corresponding to one of the aircraft wheels of the plurality of aircraft wheels, and
the one or more controllers are configured to monitor friction where pressures associated with the plurality of brakes are below a pressure threshold.

16. The aircraft system as claimed in claim 14, wherein the aircraft system comprises a wheel speed sensor configured to obtain the wheel speed data.

17. The aircraft system according to claim 14, wherein the wheel speed data is obtained when the aircraft is in flight, and wherein the time interval is a time period when the aircraft is in flight.

18. The aircraft system as claimed in claim 14, further comprising a weight-on-wheels sensor for determining the take-off of the aircraft.

19. The aircraft system as claimed in claim 14, wherein the aircraft system comprises a display located remotely from an aircraft comprising the plurality of aircraft wheels, and the one or more controllers are configured to cause, based at least in part on the signal, the display to indicate the level of friction associated with the aircraft wheel.

20. An aircraft comprising the aircraft system as claimed in claim 14.

* * * * *